US012280438B2

(12) United States Patent
Park et al.

(10) Patent No.: US 12,280,438 B2
(45) Date of Patent: Apr. 22, 2025

(54) CUTTING TOOL ASSEMBLY

(71) Applicant: TAEGUTEC LTD., Daegu (KR)

(72) Inventors: Chang Gyu Park, Daegu (KR); Sung Kook Cheon, Daegu (KR)

(73) Assignee: TaeguTec Ltd., Daegu (KR)

( * ) Notice: Subject to any disclaimer, the term of this patent is extended or adjusted under 35 U.S.C. 154(b) by 820 days.

(21) Appl. No.: 17/519,047

(22) Filed: Nov. 4, 2021

(65) Prior Publication Data

US 2022/0055125 A1    Feb. 24, 2022

Related U.S. Application Data

(63) Continuation-in-part of application No. PCT/KR2020/005648, filed on Apr. 29, 2020.

(30) Foreign Application Priority Data

May 15, 2019  (KR) .................. 10-2019-0056919
Aug. 27, 2019 (KR) .................. 10-2019-0105059

(51) Int. Cl.
  *B23C 5/06*     (2006.01)
  *B23C 5/20*     (2006.01)
(52) U.S. Cl.
  CPC ............. *B23C 5/06* (2013.01); *B23C 5/202* (2013.01); *B23C 2210/247* (2013.01); *B23C 2210/285* (2013.01); *B23C 2210/287* (2013.01)
(58) Field of Classification Search
  CPC ... B23C 5/06; B23C 5/202; B23C 2200/0494; B23C 2210/247; B23C 2210/285; B23C 2210/287; B23C 5/24
  See application file for complete search history.

(56) References Cited

U.S. PATENT DOCUMENTS 2,495,091 A * 1/1950 Bradley ............... B23C 5/2239
                                                407/36
4,586,855 A * 5/1986 Rawle ................. B23C 5/2208
                                                407/58

(Continued)

FOREIGN PATENT DOCUMENTS

EP    3 321 017    5/2018
FR    2 894 497    6/2007

(Continued)

OTHER PUBLICATIONS

Extended European Search Report issued Jan. 9, 2023 in counterpart European Application No. 20806342.0.

(Continued)

*Primary Examiner* — Sara Addisu
(74) *Attorney, Agent, or Firm* — Womble Bond Dickinson (US) LLP

(57) ABSTRACT

A cutting tool assembly includes: a cutter body extending perpendicularly from a bottom surface and including a cylindrical portion with a rotational axis; insert pockets disposed and formed concavely in the bottom surface and the cylindrical portion to be spaced apart from each other along a circumferential direction; fixed cutting inserts mounted within the insert pockets and disposed at the outermost portion of the cutter body in a radial direction; and stepped cutting inserts mounted within the insert pockets, the stepped cutting insert being disposed between two adjacent fixed cutting inserts. The fixed cutting insert is disposed to have an identical length from the rotational axis and an identical length from the bottom surface. At least one stepped cutting insert is disposed to have a different length from the rotational axis and a different length from the bottom surface compared to the remaining stepped cutting inserts.

16 Claims, 10 Drawing Sheets

(56) References Cited

U.S. PATENT DOCUMENTS

| | | | |
|---|---|---|---|
| 4,808,044 A | | 2/1989 | Tsujimura et al. |
| 5,655,860 A | | 8/1997 | Oles |
| 6,913,424 B2 | * | 7/2005 | Yoshihiro ............. B23C 5/2226 |
| | | | 407/42 |
| 7,927,047 B2 | | 4/2011 | Lysobey et al. |
| 10,058,932 B2 | * | 8/2018 | Kopton .................... B23C 5/06 |
| 2002/0172567 A1 | * | 11/2002 | Popke ....................... B23C 5/20 |
| | | | 407/43 |
| 2003/0129033 A1 | * | 7/2003 | Koskinen .................. B23C 5/06 |
| | | | 409/234 |
| 2011/0091297 A1 | * | 4/2011 | Itoh .......................... B23C 3/30 |
| | | | 408/223 |
| 2014/0147220 A1 | | 5/2014 | Cheronneau et al. |
| 2014/0161544 A1 | * | 6/2014 | Morandeau, Sr. ...... B23C 5/006 |
| | | | 407/34 |
| 2019/0262912 A1 | * | 8/2019 | Gasthuys ................. B23C 5/18 |

FOREIGN PATENT DOCUMENTS

| | | |
|---|---|---|
| JP | S62-228315 A | 10/1987 |
| JP | H03-154705 | 7/1991 |
| JP | 2004-223630 A | 8/2004 |
| SU | 1207651 A | 1/1986 |

OTHER PUBLICATIONS

International Search Report issued Jul. 29, 2020, in counterpart application No. PCT/KR2020/005648.
Written Opinion issued Jul. 29, 2020, in counterpart application No. PCT/KR2020/005648.

* cited by examiner

CUTTING TOOL ASSEMBLY

RELATED APPLICATIONS

This is a Bypass Continuation-in-Part of PCT/KR2020/005648, filed Apr. 29, 2020 and published as WO 2020/231047A1 on Nov. 19, 2020. Priority is claimed to KR 10-2019-0056919 filed May 15, 2019 and also to KR 10-2019-0105059 filed Aug. 27, 2019. The contents of the aforementioned applications are incorporated by reference in their entirety.

BACKGROUND OF THE INVENTION

Technical Field

The present invention is directed to a cutting tool assembly for face milling.

Background Art

A cutting tool assembly for face milling is used when machining a plane perpendicular to a rotational axis of the cutting tool assembly and is referred to as a face milling cutter or a face cutter. The cutting tool assembly for face milling includes a cutter body and a plurality of cutting inserts mounted on a periphery and a front surface of the cutter body. The plurality of cutting inserts are disposed on the cutter body so as to be spaced apart from each other along a circumferential direction of the cutter body. The plurality of cutting inserts are mounted on the cutter body so as to cut a workpiece step by step. For example, in the circumferential direction of the cutter body, the plurality of cutting inserts are disposed such that they protrude gradually from the periphery and an axial end of the cutter body.

SUMMARY OF THE INVENTION

Technical Problem

In the conventional cutting tool assembly for face milling, when the plurality of cutting inserts are disposed such that they protrude gradually from the periphery and the axial end of the cutter body along the circumferential direction of the cutter body, there exists a large difference between a length protruding from the periphery of the first-mounted cutting insert and a length protruding from the periphery of the last-mounted cutting insert in the circumferential direction of cutter body. In addition, there is a large difference between a length protruding from the axial end of the first-mounted cutting insert and a length protruding from the axial end of the last-mounted cutting insert. In such case, the first-mounted cutting insert may form thick chips to thereby exert an excessive cutting force on the cutting insert. As a result, the lifespan of the cutting tool assembly may be shortened. Moreover, since vibration occurs in the cutting tool assembly, the surface roughness of machined surface of the workpiece may be deteriorated.

Embodiments of the present disclosure improve or solve at least some problems of the conventional cutting tool assembly for face milling. To this end, various embodiments of the present disclosure provide a cutting tool assembly having a plurality of fixed cutting inserts and a plurality of stepped cutting inserts.

Solution to Problem

Embodiments according to one aspect of the present disclosure is directed to a cutting tool assembly. The cutting tool assembly according to an exemplary embodiment includes: a cutter body extending perpendicularly from a bottom surface and including a cylindrical portion with a rotational axis; a plurality of insert pockets disposed and formed concavely in the bottom surface and the cylindrical portion of the cutter body to be spaced apart from each other along a circumferential direction; a plurality of fixed cutting inserts mounted within the plurality of insert pockets and disposed at the outermost portion of the cutter body in a radial direction; and a plurality of stepped cutting inserts mounted within the plurality of insert pockets, each of the plurality of stepped cutting inserts being disposed between two adjacent fixed cutting inserts among the plurality of fixed cutting inserts. Each of the plurality of fixed cutting inserts is disposed to have an identical length from the rotational axis and an identical length from the bottom surface. At least one stepped cutting insert among the plurality of stepped cutting inserts is disposed to have a different length from the rotational axis and a different length from the bottom surface compared to the remaining stepped cutting inserts among the plurality of stepped cutting inserts.

In one embodiment, each of the plurality of stepped cutting inserts may be disposed to have different lengths from the rotational axis and different lengths from the bottom surface with one another.

In one embodiment, the plurality of stepped cutting inserts may be disposed such that the length of each of the stepped cutting inserts from the rotational axis gradually increases or decreases along the circumferential direction.

In one embodiment, the plurality of stepped cutting inserts may be disposed such that two adjacent stepped cutting inserts among the stepped cutting inserts have the same length difference from the rotational axis.

In one embodiment, the plurality of stepped cutting inserts may be disposed such that the length of each of the stepped cutting inserts from the bottom surface gradually increases or decreases along the circumferential direction.

In one embodiment, the plurality of stepped cutting inserts may be disposed such that two adjacent stepped cutting inserts among the stepped cutting inserts have the same length difference from the bottom surface.

In one embodiment, the plurality of stepped cutting inserts may be disposed such that, for two adjacent stepped cutting inserts among the stepped cutting inserts, a length difference from the rotational axis is longer than a length difference from the bottom surface.

In one embodiment, the length from the rotational axis in the plurality of fixed cutting inserts may be equal to or longer than the lengths from the rotational axis in the plurality of stepped cutting inserts.

In one embodiment, the length from the bottom surface in the plurality of fixed cutting inserts may be equal to or shorter than the lengths from the bottom surface in the plurality of stepped cutting inserts.

In one embodiment, a total number of the plurality of fixed cutting inserts and the plurality of stepped cutting inserts may be 6 to 20.

In one embodiment, each of the plurality of fixed cutting inserts may have the same shape as each of the plurality of stepped cutting inserts.

In one embodiment, each of the plurality of fixed cutting inserts may include a plurality of first major cutting edges and a plurality of first minor cutting edges. Each of the plurality of stepped cutting inserts may include a plurality of second major cutting edges and a plurality of second minor cutting edges.

In one embodiment, a first insert bore for mounting within each of the insert pockets may be formed in each of the plurality of fixed cutting inserts. A second insert bore for mounting within each of the insert pockets may be formed in each of the plurality of stepped cutting inserts.

In one embodiment, each of the plurality of fixed cutting inserts may be rotationally symmetrical with respect to a central axis of the first insert bore. Each of the plurality of stepped cutting inserts may be rotationally symmetrical with respect to a central axis of the second insert bore.

Advantageous Effects of Invention

According to the cutting tool assembly in accordance with one embodiment, the plurality of fixed cutting inserts may be disposed to have an identical length from the bottom surface of the cutter body and an identical length from the rotational axis, while at least one stepped cutting insert among the plurality of stepped cutting inserts may be disposed to have a different length from the rotational axis and a different length from the bottom surface compared to the remaining stepped cutting inserts among the plurality of stepped cutting inserts.

For example, since the plurality of fixed cutting inserts and the plurality of stepped cutting inserts are disposed in a zigzag pattern along the circumferential direction of the cutter body, it is possible to minimize the gaps between protruding lengths of the plurality of fixed cutting inserts and protruding lengths of the plurality of stepped cutting inserts. With such configuration, an excessive force acting on specific cutting inserts can be suppressed or prevented. As a result, it is possible to enhance the lifespan of the cutting tool assembly. In addition, it is possible to improve the surface roughness of a machined surface of the workpiece by suppressing or preventing the vibrations from occurring in the cutting tool assembly.

DETAILED DESCRIPTION

Figure 1:
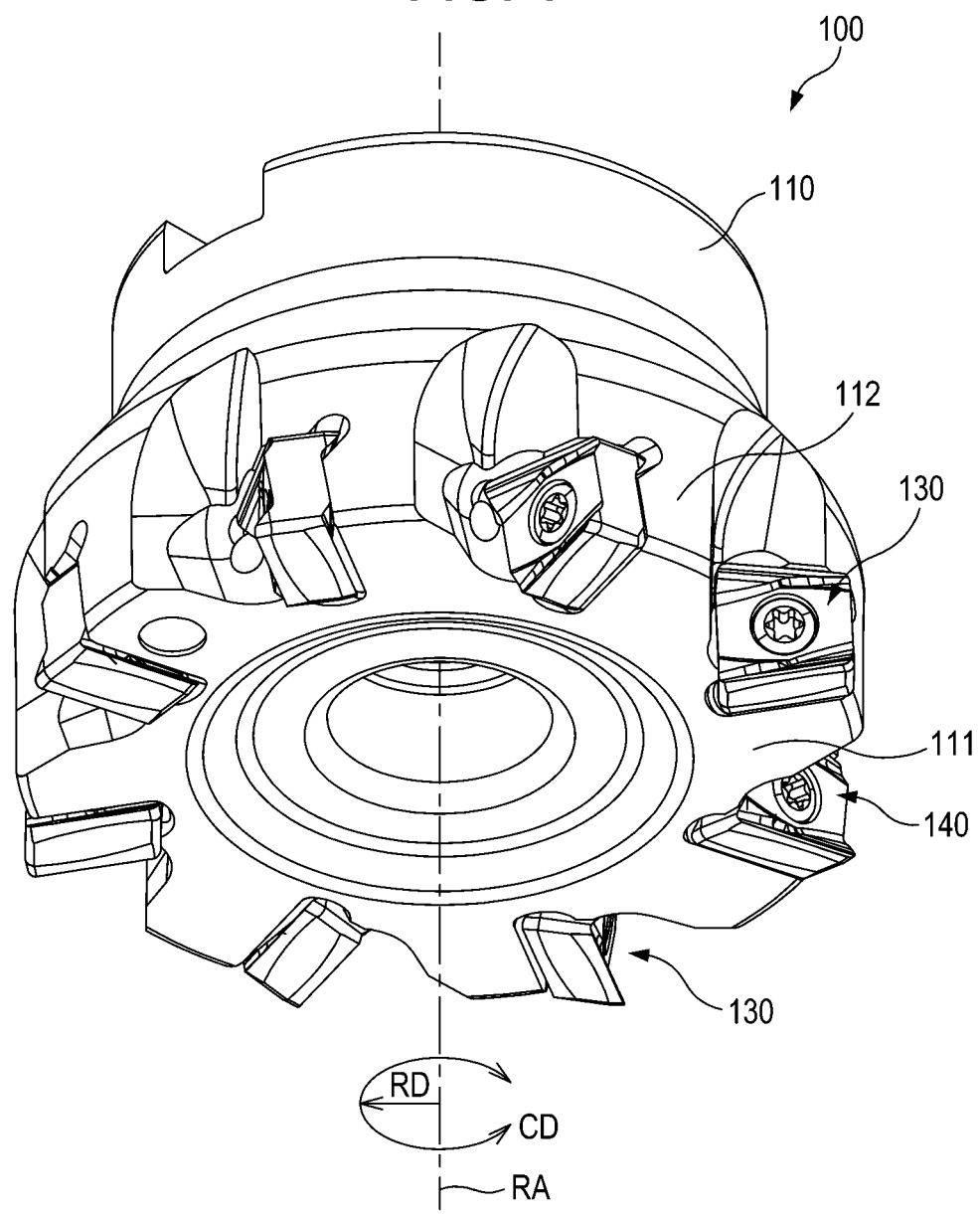
FIG. 1 is a perspective view showing a cutting tool assembly according to one embodiment of the present disclosure.

Embodiments of the present disclosure are shown for the purpose of explaining the technical idea of the present disclosure. The scope of the rights according to the present disclosure is not limited to the embodiments presented below or the detailed descriptions of such embodiments.

All of the technical terms and scientific terms in the present disclosure include meanings or definitions that are commonly understood by those of ordinary skill in the art unless defined otherwise. All of the terms in the present disclosure are selected for the purpose of describing the present disclosure more clearly, and are not selected to limit the scope of the present disclosure.

As used in the present disclosure, expressions such as "comprising," "including," "having" and the like are to be understood as open-ended terms having the possibility of encompassing other embodiments, unless mentioned otherwise with respect to the phrase or sentence containing such expressions.

The singular expressions that are described in the present disclosure may encompass plural expressions unless otherwise stated, which will be also applied to the singular expressions in the claims.

The expressions such as "first," "second," etc., which are shown in various embodiments of the present disclosure, are used to separate a plurality of elements from each other, and are not intended to limit an order or importance of the corresponding elements.

In the present disclosure, the term "radial direction RD" may be defined to mean a direction away from or toward a rotational axis RA of a cutter body of a cutting tool assembly. The term "circumferential direction CD" may be defined to mean a direction surrounding the rotational axis RA.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

FIG. 1 is a perspective view showing a cutting tool assembly according to one embodiment of the present disclosure.

As shown in FIG. 1, the cutting tool assembly 100 according to one embodiment of the present disclosure includes: a cutter body 110; a plurality of insert pockets 120; a plurality of fixed cutting inserts 130; and a plurality of stepped cutting inserts 140. The cutting tool assembly 100 may be used for face milling and is also referred to as a face milling cutter or a face cutter.

The cutter body 110 may include a bottom surface 111 and a cylindrical portion 112. The bottom surface 111 is approximately perpendicular to the rotational axis RA of the cutter body 110 and is disposed substantially parallel to a machined surface of a workpiece. The cylindrical portion 112 extends vertically from the bottom surface 111. In one embodiment, the bottom surface 111 is located so as to face the machined surface of the workpiece, and a rotary driving part for a cutting tool is disposed on an upper side opposite to the bottom surface 111 along the rotational axis RA of the cutter body 110. The rotary driving part may be directly coupled to the upper side of the cutter body 110, or may be indirectly coupled to the upper side of the cutter body 110 via another member.

Figure 2:
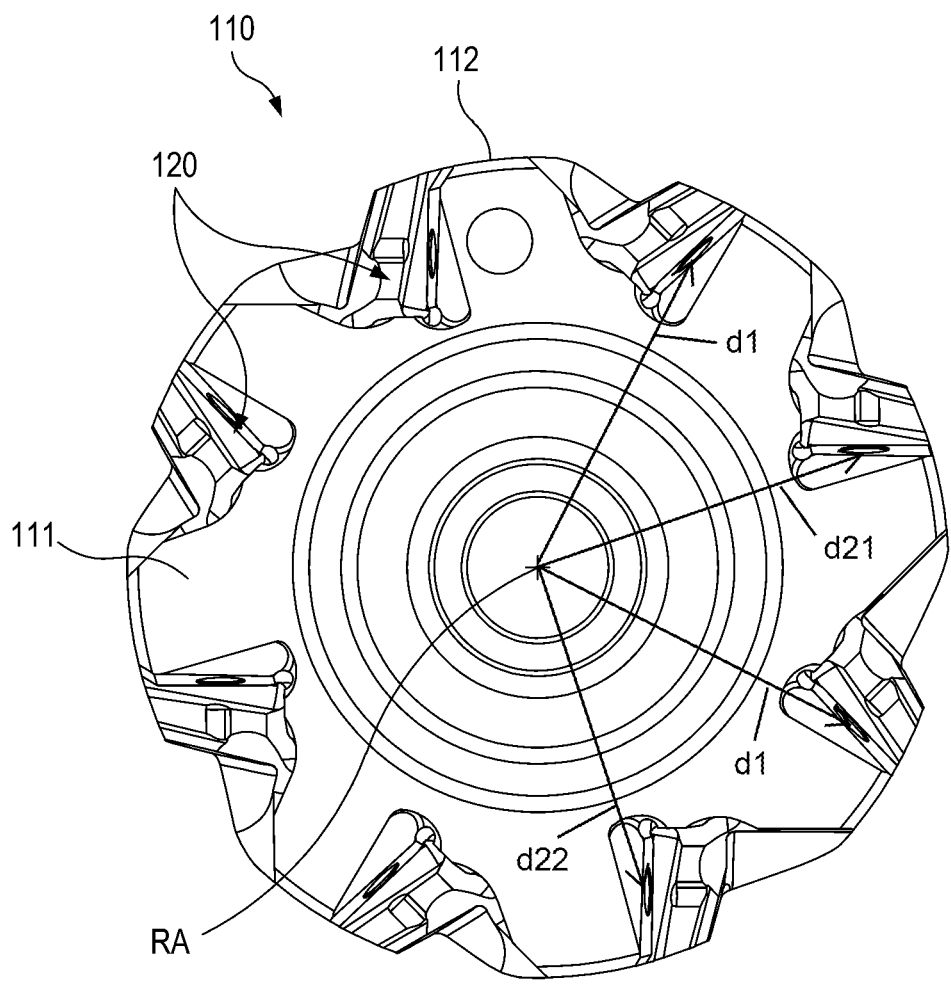
FIG. 2 is a bottom view showing a cutter body shown in FIG. 1 according to one embodiment of the present disclosure.

FIG. 2 is a bottom view showing the cutter body shown in FIG. 1.

As shown in FIG. 2, the plurality of insert pockets 120 are spaced apart from one another along the circumferential direction CD and formed in a concave shape. The plurality of insert pockets 120 are formed to be recessed over the bottom surface 111 and the cylindrical portion 112. Each of the plurality of insert pockets 120 is formed to be larger than the plurality of fixed cutting inserts 130 and the plurality of stepped cutting inserts 140 so that the chips cut from the workpiece are smoothly discharged. Each of the plurality of insert pockets 120 may be formed to correspond to the arrangement positions of the plurality of fixed cutting inserts 130 and the plurality of stepped cutting inserts 140. As an example, the plurality of insert pockets 120 may be spaced apart from one another and arranged at equal intervals along the circumferential direction CD. As another example, the plurality of insert pockets 120 may be spaced apart from one another and arranged at different intervals.

Figure 3:
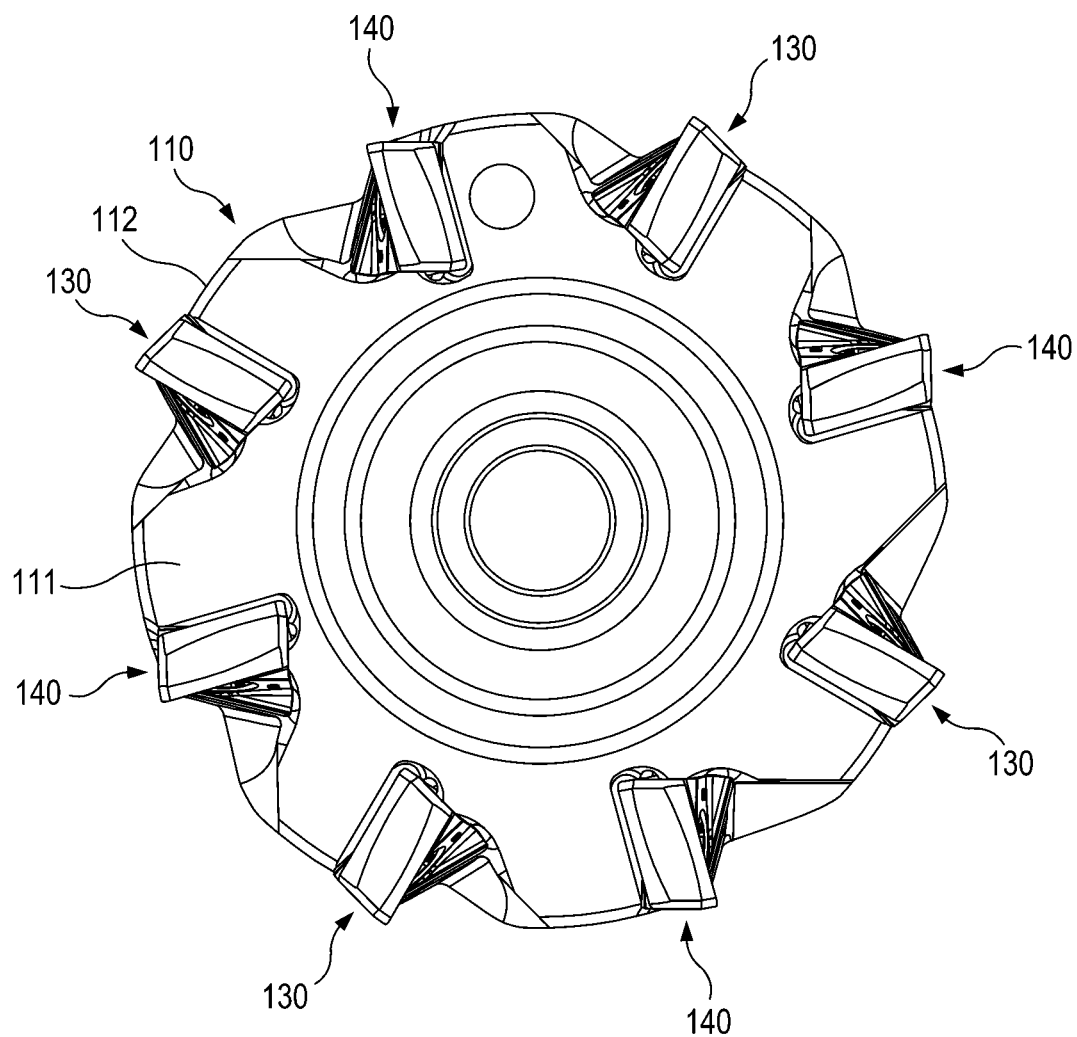
FIG. 3 is a bottom view showing the cutting tool assembly shown in FIG. 1 according to one embodiment of the present disclosure.

FIG. 3 is a bottom view showing the cutting tool assembly shown in FIG. 1.

As shown in FIG. 3, the plurality of fixed cutting inserts 130 are mounted inside the plurality of insert pockets 120 and disposed on the outermost portion of the cutter body 110 in the radial direction RD. Each of the plurality of fixed cutting inserts 130 is disposed such that the length from the rotational axis RA or the length protruding from the cylindrical portion 112 remains the same. The length from the rotational axis RA in the plurality of fixed cutting inserts 130 may be understood to be a fixed cutting radius Rf at which the workpiece is cut at the time of cutting the workpiece. That is, the plurality of fixed cutting inserts 130 are arranged to have the same fixed cutting radius Rf from the rotational axis RA of the cutter body 110. Each of the plurality of fixed cutting inserts 130 is arranged to have the same length from the bottom surface 111 or the same length protruding from the bottom surface 111. The length from the bottom surface 111 in the plurality of fixed cutting inserts 130 may be understood to be a fixed cutting depth Df at which the workpiece is cut at the time of cutting the workpiece. That is, the plurality of fixed cutting inserts 130 are arranged to have the same fixed cutting depth Df.

The plurality of stepped cutting inserts 140 are mounted inside the plurality of insert pockets 120. In one embodiment, the plurality of stepped cutting inserts 140 may include a first stepped cutting insert 141, a second stepped cutting insert 142, a third stepped cutting insert 143, and a fourth stepped cutting insert 144. Each of the plurality of stepped cutting inserts 140 is disposed between two adjacent fixed cutting inserts among the plurality of fixed cutting inserts 130. That is, the fixed cutting inserts 130 and the stepped cutting inserts 140 are arranged alternately with one another. At least one cutting insert among the plurality of stepped cutting inserts 140 is arranged to have a different length from the rotational axis RA as compared to the remaining stepped cutting inserts among the plurality of stepped cutting inserts 140. The length from the rotational axis RA in the plurality of stepped cutting inserts 140 may be understood to be a stepped cutting radius Rs at which the workpiece is cut at the time of cutting the workpiece. That is, at least one stepped cutting insert among the plurality of stepped cutting inserts 140 is arranged to have a different stepped cutting radius Rs as compared to the remaining stepped cutting inserts among the plurality of stepped cutting inserts 140. At least one stepped cutting insert among the plurality of stepped cutting inserts 140 is arranged to have a different length from the bottom surface 111 as compared to the remaining stepped cutting inserts among the plurality of stepped cutting inserts 140. The length from the bottom surface 111 in the plurality of stepped cutting inserts 140 may be understood to be a stepped cutting depth Ds at which the workpiece is cut at the time of cutting the workpiece. That is, at least one stepped cutting insert among the plurality of stepped cutting inserts 140 is disposed to have a different stepped cutting depth Ds as compared to the remaining stepped cutting inserts among the plurality of stepped cutting inserts 140.

The plurality of fixed cutting inserts 130 having the same fixed cutting radius Rf and the same fixed cutting depth Df, and the plurality of stepped cutting inserts 140 having at least one different stepped cutting radius Rs and at least one different stepped cutting depth Ds are arranged alternately with one another. Accordingly, when the workpiece is machined by the cutting tool assembly 100, it is possible to suppress or prevent a sudden change in the cutting radius or cutting depth. As such, it is possible to minimize damage or breakage of the fixed cutting inserts 130 or the stepped cutting inserts 140 due to the sudden change in the cutting radius and cutting depth. As a result, it is possible to prolong a lifespan of the fixed cutting inserts 130 or the stepped cutting inserts 140.

In one embodiment, each of the plurality of stepped cutting inserts 140 may be arranged to have a different length (i.e., a different stepped cutting radius Rs) from the rotational axis RA and a different length (i.e., a different stepped cutting depth Ds) from the bottom surface 111.

Figure 4:
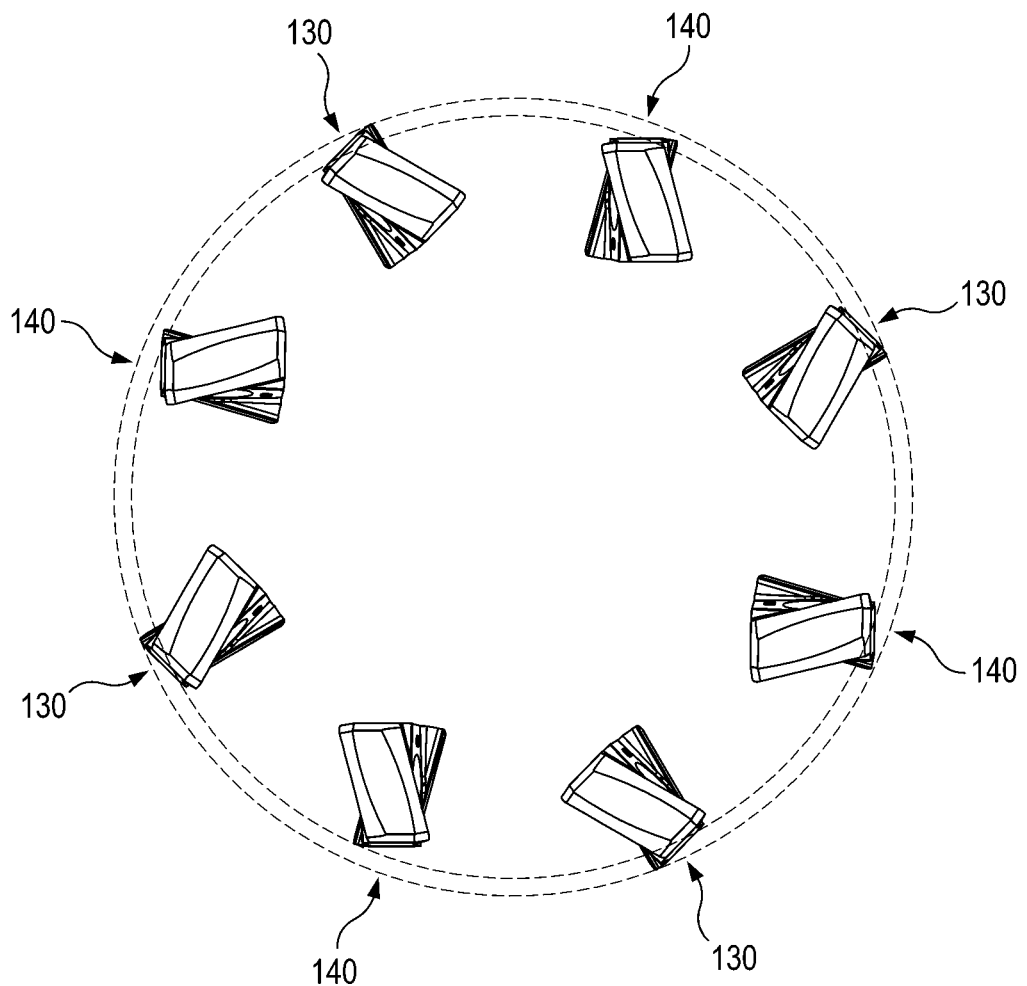
FIG. 4 is a plan view showing a plurality of cutting inserts as shown in FIG. 1 according to one embodiment of the present disclosure.

FIG. 4 is a plan view showing the plurality of cutting inserts shown in FIG. 1.

In one embodiment, the plurality of stepped cutting inserts 140 may be arranged such that the length from the rotational axis RA gradually increases or decreases along the circumferential direction CD. That is, as shown in FIG. 4, the stepped cutting radius Rs of each of the stepped cutting inserts 140 may be set to gradually increase or decrease along the circumferential direction CD. For example, two adjacent stepped cutting inserts among the plurality of stepped cutting inserts 140 may be arranged such that the length from the rotational axis RA has a constant spacing. That is, in two adjacent stepped cutting inserts, the amount of change (ΔRs1, ΔRs2, ΔRs3, etc.) of the stepped cutting radius Rs (see FIG. 5) is set to be constant. Each of the stepped cutting radii Rs of two adjacent stepped cutting inserts among the plurality of stepped cutting inserts 140 may be lengthened or shortened to have the same spacing. In this regard, the circumferential direction CD may be understood to be a circumferential direction extending along a direction in which the cutter body 110 rotates. The plurality of stepped cutting inserts 140 having a stepped cutting radius Rs gradually increasing or decreasing along the circumferential direction CD are disposed between two adjacent fixed cutting inserts among the plurality of fixed cutting inserts 130 having the same fixed cutting radius Rf. Accordingly, it is possible to more effectively suppress or prevent a sudden change in the cutting radius among the plurality of stepped cutting inserts 140 as well as a sudden change in the cutting radius between each of the fixed cutting inserts 130 and each of the stepped cutting inserts 140.

In one embodiment, the plurality of stepped cutting inserts 140 may be arranged such that the length from the bottom surface 111 gradually decreases or increases along the circumferential direction CD. That is, the stepped cutting depth Ds of each of the stepped cutting inserts 140 may be set to gradually decrease or increase along the circumferential direction CD. For example, two adjacent stepped cutting inserts among the plurality of stepped cutting inserts 140 may be arranged such that the length from the bottom surface 111 has a constant spacing. That is, in two adjacent stepped cutting inserts, the amount of change (ΔDs1, ΔDs2, ΔDs3, etc.) of the stepped cutting depth Ds (see FIG. 5) is set to be constant. Each of the stepped cutting depths Ds of two adjacent stepped cutting inserts among the plurality of stepped cutting inserts 140 may decrease or increase to have the same spacing. The plurality of stepped cutting inserts 140 having a stepped cutting depth Ds gradually increasing or decreasing along the circumferential direction CD are disposed between two adjacent fixed cutting inserts among the plurality of fixed cutting inserts 130 having the same fixed cutting depth Df. Therefore, it is possible to more effectively suppress or prevent a sudden change in the cutting depth among the plurality of stepped cutting inserts 140 as well as a sudden change in the cutting depth between each of the fixed cutting inserts 130 and each of the stepped cutting inserts 140.

In one embodiment, two adjacent stepped cutting inserts among the plurality of stepped cutting inserts 140 may be arranged such that a difference in length from the rotational axis RA is greater than a difference in length from the bottom surface 111. That is, the amount of change in the stepped cutting radius Rs is set larger than the amount of change in the stepped cutting depth Ds. Accordingly, the surface roughness of the surface parallel to the bottom surface 111 among the machined surfaces of the workpiece is superior to the surface roughness of the surface perpendicular to the bottom surface 111. For example, in two adjacent stepped cutting inserts, the difference in length from the rotational axis RA may be 1 mm, and the difference in length from the bottom surface 111 may be 0.05 mm.

Figure 5:
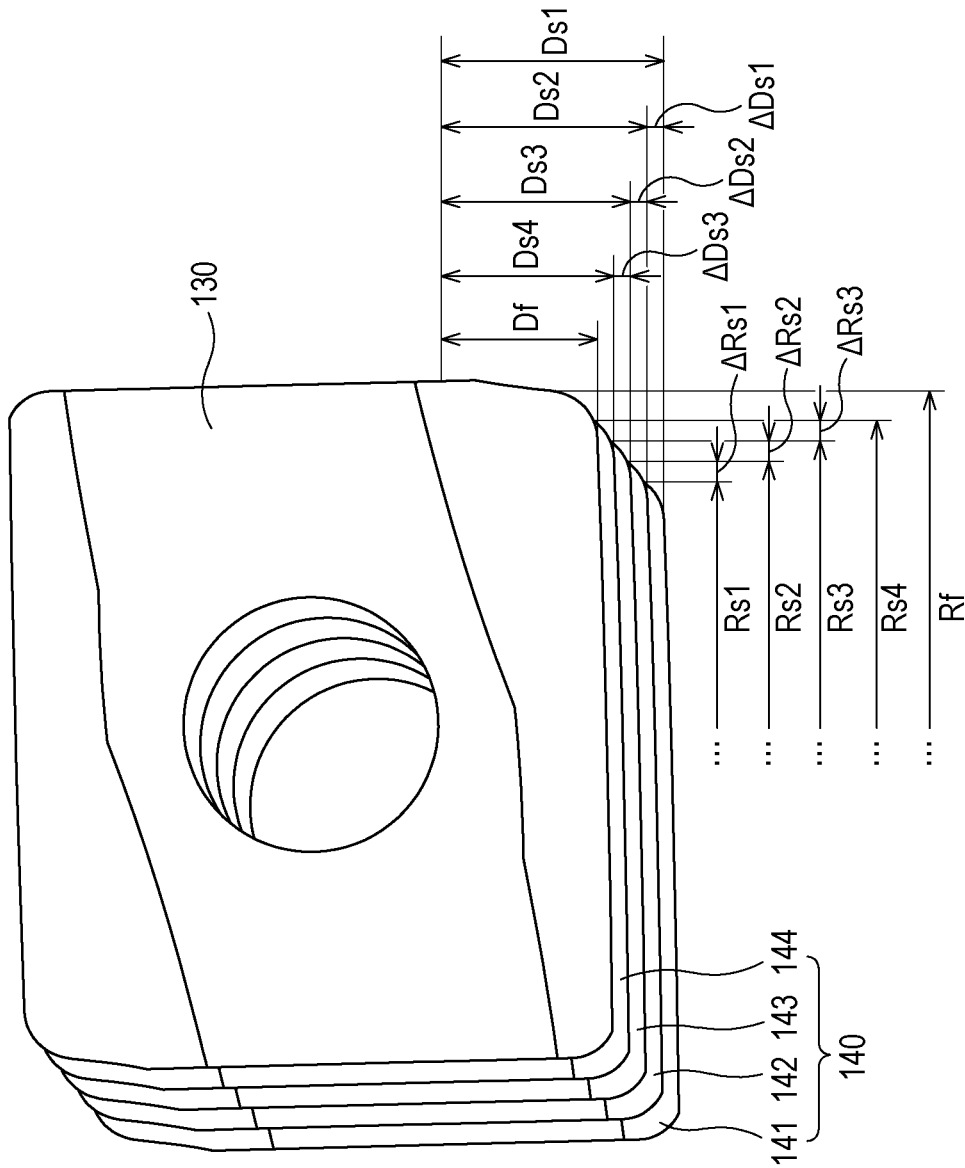
FIG. 5 is a drawing showing an arrangement of the plurality of cutting inserts shown in FIG. 1 according to one embodiment of the present disclosure.

FIG. 5 is a drawing showing the arrangement of the plurality of cutting inserts shown in FIG. 1. Specifically, FIG. 5 shows a state in which the plurality of fixed cutting inserts 130 and the plurality of stepped cutting inserts 140 are arranged at a predetermined point as the cutter body 110 rotates around the rotational axis RA. The fixed cutting radius Rf and the stepped cutting radius Rs are usually measured from the rotational axis RA of the cutter body 110. In FIG. 5, only a part thereof is shown for the convenience of illustration.

As shown in FIG. 5, as the cutter body 110 rotates, the fixed cutting insert 130, the first stepped cutting insert 141, the fixed cutting insert 130, the second stepped cutting insert 142, the fixed cutting insert 130, the third stepped cutting insert 143, the fixed cutting insert 130 and the fourth stepped cutting insert 144 are sequentially positioned at the predetermined point. The order of the first to fourth stepped cutting inserts may be set contrary to that shown in FIG. 5.

The first stepped cutting insert 141 has a first stepped cutting radius Rs1, the second stepped cutting insert 142 has a second stepped cutting radius Rs2, the third stepped cutting insert 143 has a third stepped cutting radius Rs3, and the fourth stepped cutting insert 144 has a fourth stepped cutting radius Rs4. The first to fourth stepped cutting radii Rs1, Rs2, Rs3 and Rs4 may be set to gradually increase. The plurality of fixed cutting inserts 130 having the same fixed cutting radius Rf and the plurality of stepped cutting inserts 140 having the gradually-increasing first to fourth stepped cutting radii Rs1, Rs2, Rs3 and Rs4 are alternately and sequentially located to cut the workpiece. As such, it is possible to further minimize damage or breakage of the fixed cutting inserts 130 or the stepped cutting inserts 140 due to the sudden change in the cutting radius. As a result, it is possible to further prolong the lifespan of the fixed cutting inserts 130 or the stepped cutting inserts 140. When the order of the first to fourth stepped cutting inserts 141, 142, 143 and 144 is set contrary to that shown in FIG. 5, it may be understood that the first to fourth stepped cutting radii gradually decrease.

The first stepped cutting insert 141 has a first stepped cutting depth Ds1, the second stepped cutting insert 142 has a second stepped cutting depth Ds2, the third stepped cutting insert 143 has a third stepped cutting depth Ds3, and the fourth stepped cutting insert 144 has a fourth stepped cutting depth Ds4. The first to fourth stepped cutting depths Ds1, Ds2, Ds3 and Ds4 may be set to gradually decrease. The plurality of fixed cutting inserts 130 having the same fixed cutting depth Df and the plurality of stepped cutting inserts 140 having the gradually-decreasing first to fourth stepped cutting depths Ds1, Ds2, Ds3 and Ds4 are alternately and sequentially located to cut the workpiece. As such, it is possible to further minimize damage or breakage of the fixed cutting inserts 130 or the stepped cutting inserts 140 due to the sudden change in the cutting depth. As a result, it is possible to further prolong the lifespan of the fixed cutting inserts 130 or the stepped cutting inserts 140. When the order of the first to fourth stepped cutting inserts 141, 142, 143 and 144 is set contrary to that shown in FIG. 5, it may be understood that the first to fourth stepped cutting depths gradually increase.

As shown in FIG. 5, in one embodiment, the length from the rotational axis RA (i.e., the fixed cutting radius Rf) in the plurality of fixed cutting inserts 130 may be set to be equal to or longer than the length from the rotational axis RA (i.e., the stepped cutting radius Rs) in the plurality of stepped cutting inserts 140. For example, the fixed cutting radius Rf of the plurality of fixed cutting inserts 130 may be set to be equal to or longer than the first to fourth stepped cutting radii Rs1, Rs2, Rs3 and Rs4 of the first to fourth stepped cutting inserts 141, 142, 143 and 144. As described above, when the fixed cutting radius Rf is set to be equal to or longer than the stepped cutting radius Rs, the plurality of fixed cutting inserts 130 perform cutting so as to have the same fixed cutting radius Rf, and the plurality of stepped cutting inserts 140 perform cutting so as to have the stepped cutting radius Rs which is equal to the fixed cutting radius Rf or different from the fixed cutting radius Rf in an inner side along the radial direction RD than the fixed cutting radius Rf. Accordingly, the cutting force can be distributed to the plurality of fixed cutting inserts 130, and the cutting force acting on the plurality of stepped cutting inserts 140 can be reduced. As a result, it is possible to suppress or prevent the plurality of stepped cutting inserts 140 from being broken or damaged. In addition, the thickness of chips cut from the workpiece by the plurality of stepped cutting inserts 140 is kept constant, which makes it possible to improve the surface roughness of the machined surface of the workpiece.

In one embodiment, the length from the bottom surface 111 (i.e., the fixed cutting depth Df) in the plurality of fixed cutting inserts 130 may be set to be equal to or shorter than the length from the bottom surface 111 (i.e., the stepped cutting depth Ds) in the plurality of stepped cutting inserts 140. As described above, when the fixed cutting depth Df is set to be equal to or shallower than the stepped cutting depth Ds, the plurality of fixed cutting inserts 130 perform cutting so as to have the same fixed cutting depth Df, and the plurality of stepped cutting inserts 140 perform cutting so as to have the stepped cutting depth Ds which is equal to the fixed cutting depth Df or different from the fixed cutting depth Df. Accordingly, it is possible to suppress or prevent sudden changes in the fixed cutting depth Df of the plurality of fixed cutting inserts 130 and the stepped cutting depth Ds of the plurality of stepped cutting inserts 140.

In one embodiment, a total number of the plurality of fixed cutting inserts 130 and the plurality of stepped cutting inserts 140 may be 6 to 20. In order to achieve the above-described effects due to the plurality of stepped cutting inserts 140, the total number of cutting inserts may be set to 6 or more. In addition, the total number of cutting inserts may be set to 20 or less so that the cutting inserts may be applied to a large-sized cutter having a large-diameter cutter body 110. In addition, the total number of the plurality of fixed cutting inserts 130 and the plurality of stepped cutting inserts 140 may be set to an even number.

Figure 6:
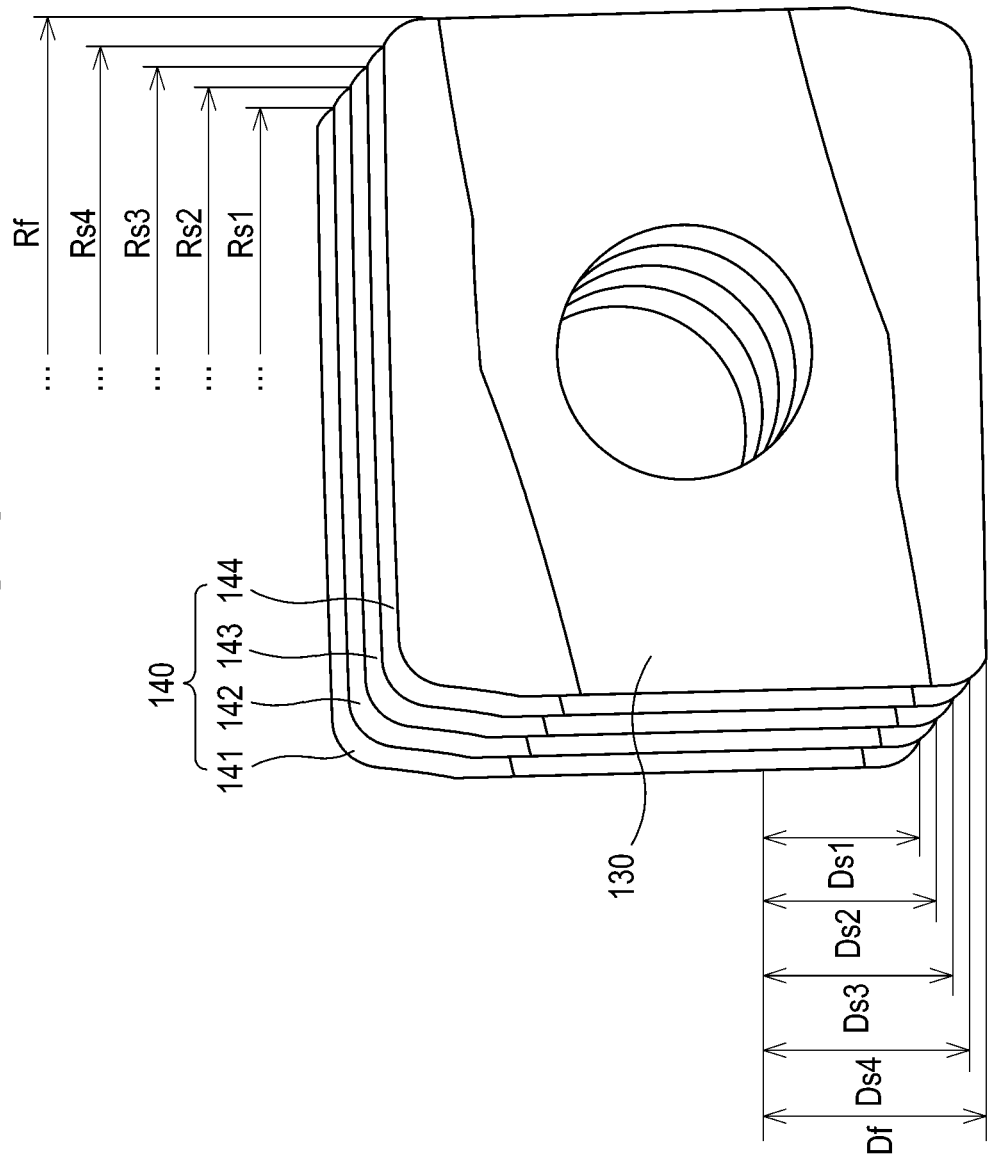
FIG. 6 is a drawing showing an arrangement of the plurality of cutting inserts according to another embodiment of the present disclosure.

FIG. 6 is a view showing the arrangement of the plurality of cutting inserts according to another embodiment of the present disclosure.

As shown in FIG. 6, the first to fourth stepped cutting radii Rs1, Rs2, Rs3 and Rs4 of the first to fourth stepped cutting inserts 141, 142, 143 and 144 may be set to gradually increase, and the first to fourth stepped cutting depths Ds1, Ds2, Ds3 and Ds4 of the fourth to fourth stepped cutting inserts 141, 142, 143 and 144 may be set to gradually increase. The plurality of fixed cutting inserts 130 having the same fixed cutting depth Df and the plurality of stepped cutting inserts 140 having the gradually-increasing first to fourth stepped cutting depths Ds1, Ds2, Ds3 and Ds4 are alternately and sequentially located to cut the workpiece. Accordingly, it is possible to further minimize damage or breakage of the fixed cutting inserts 130 or the stepped cutting inserts 140 due to the sudden change in the cutting depth. As a result, it is possible to further prolong the lifespan of the fixed cutting inserts 130 or the stepped cutting inserts 140. When the order of the first to fourth stepped cutting inserts 141, 142, 143 and 144 is set contrary to that shown in FIG. 6, it may be understood that the first to fourth stepped cutting depths gradually increase.

In one embodiment, each of the plurality of fixed cutting inserts 130 may have the same shape as each of the plurality of stepped cutting inserts 140. Since the plurality of fixed cutting inserts 130 and the plurality of stepped cutting inserts 140 have the same shape as described above, one type of cutting inserts may be used as the fixed cutting inserts 130 or the stepped cutting inserts 140. In addition, even when there is a need to replace any one of the cutting inserts, it is possible to use the fixed cutting inserts 130 or the stepped cutting inserts 140 without having to distinguish them. This can make it convenient to perform maintenance of the cutting tool assembly.

In one embodiment, each of the plurality of fixed cutting inserts 130 may include a plurality of first major cutting edges 130a and a plurality of first minor cutting edges 130b, and each of the plurality of stepped cutting inserts 140 may include a plurality of second major cutting edges and a plurality of second minor cutting edges. When each of the plurality of fixed cutting inserts 130 has the same shape as each of the plurality of stepped cutting inserts 140, the first major cutting edges 130a and the first minor cutting edges 130b may also have the same shape as the second major cutting edges and the second minor cutting edges, respectively. Accordingly, hereinafter, description will be given by focusing on one fixed cutting insert 130 having a first major cutting edge 130a and a first minor cutting edge 130b.

Figure 7:
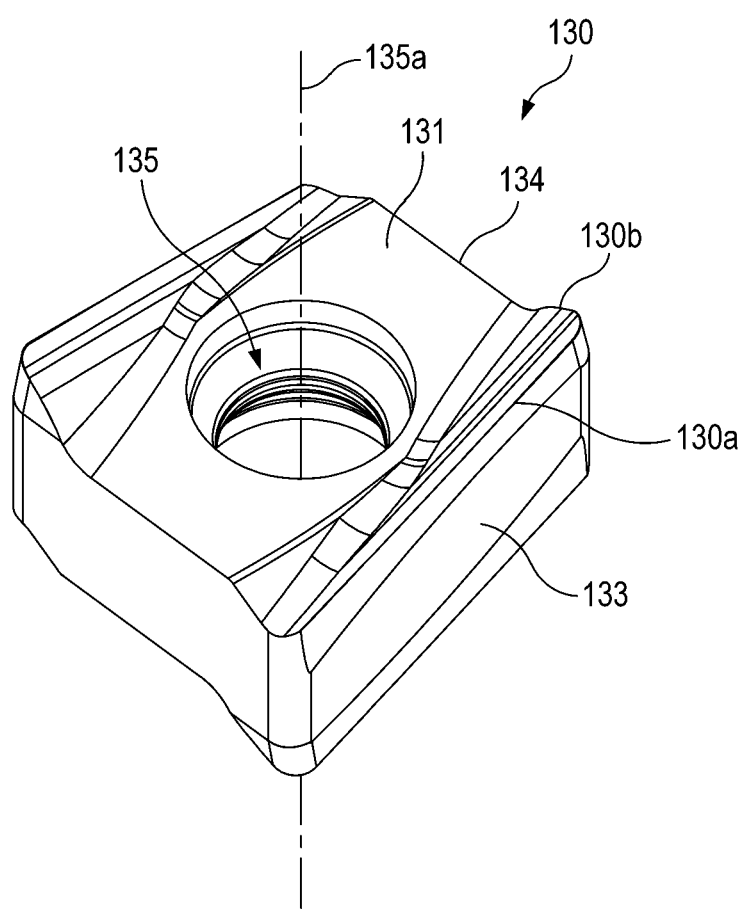
FIG. 7 is a perspective view showing the cutting insert shown in FIG. 5 according to one embodiment of the present disclosure.

FIG. 7 is a perspective view showing the cutting insert shown in FIG. 5.

As shown in FIG. 7, the fixed cutting insert 130 may include an upper face 131, a lower face 132, and first and second side faces 133 and 134 that meet at corners of the upper face 131. The first major cutting edge 130a is formed at an edge where the first side face 133 and the upper face 131 meet, and the first minor cutting edge 130b is formed at an edge where the second side face 134 and the upper face 131 meet. The first major cutting edge 130a and the first minor cutting edge 130b are formed to protrude beyond the upper face 131. The first major cutting edge 130a is used to cut the front surface of the workpiece (i.e., the surface perpendicular to the rotational axis RA of the cutter body 110), and the first minor cutting edge 130b is used to cut the side surface of the workpiece (i.e., the surface parallel to the rotational axis RA of the cutter body 110).

Figure 8:
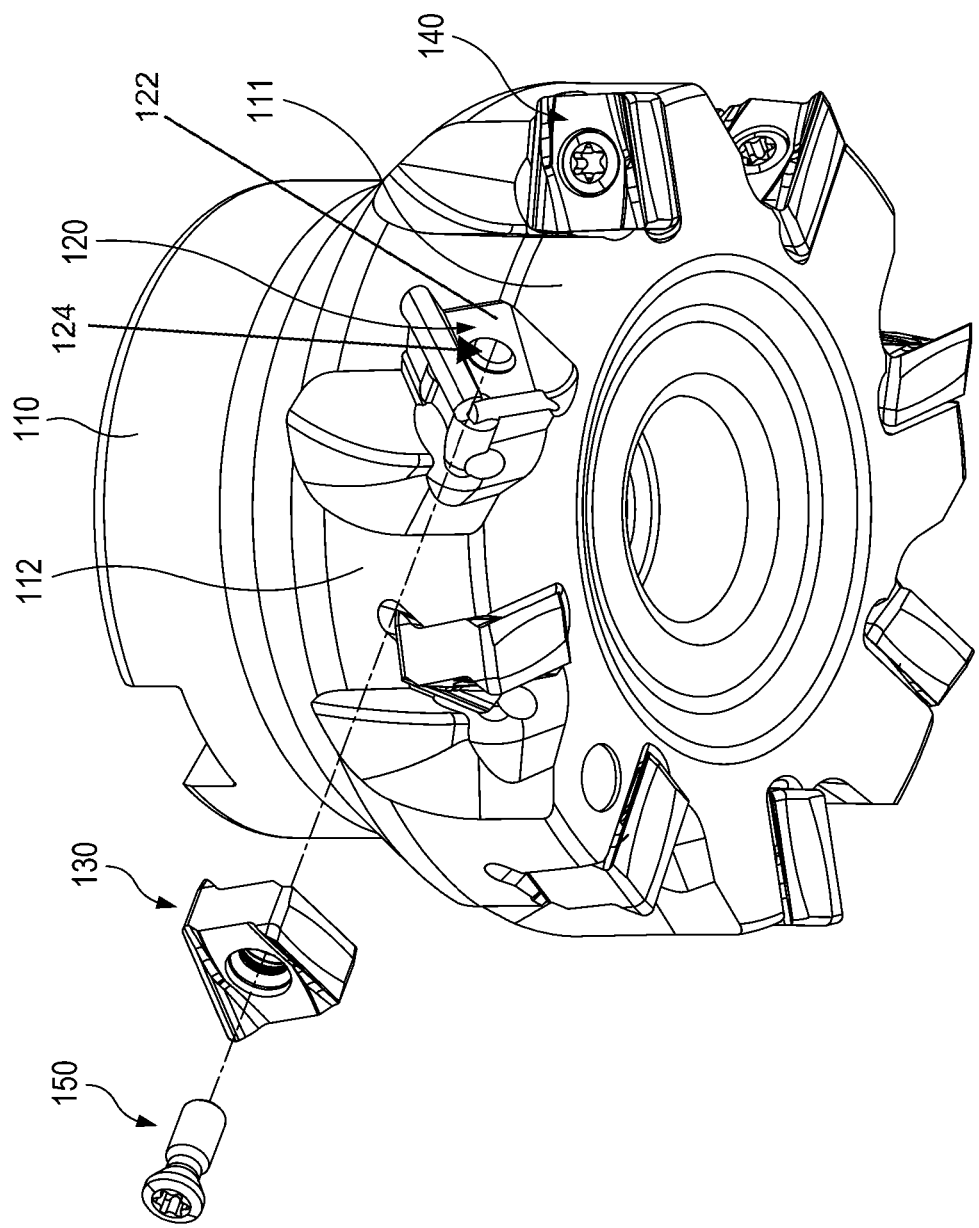
FIG. 8 is an exploded perspective view showing the cutting tool assembly shown in FIG. 1 according to one embodiment of the present disclosure.

FIG. 8 is an exploded perspective view showing the cutting tool assembly shown in FIG. 1.

In one embodiment, as shown in FIG. 8, each of the plurality of fixed cutting inserts 130 may be formed with a first insert bore 135 for mounting in the insert pocket 120, and each of the plurality of stepped cutting inserts 140 may be formed with a second insert bore for mounting in the insert pocket. When each of the plurality of fixed cutting inserts 130 has the same shape as each of the plurality of stepped cutting inserts 140, the first insert bore 135 may have the same shape as the second insert bore. Therefore, hereinafter, the first insert bore 135 will be mainly described. The first insert bore 135 is formed to penetrate through the upper face 131 and the lower face 132. The first insert bore 135 is formed to be perpendicular to the upper face 131 and the lower face 132 and is formed to be parallel to the first and second side faces 133 and 134. The set screw 150 passes through the first insert bore 135 and is fastened to the insert pocket 120 of the cutter body 110.

Figure 9:
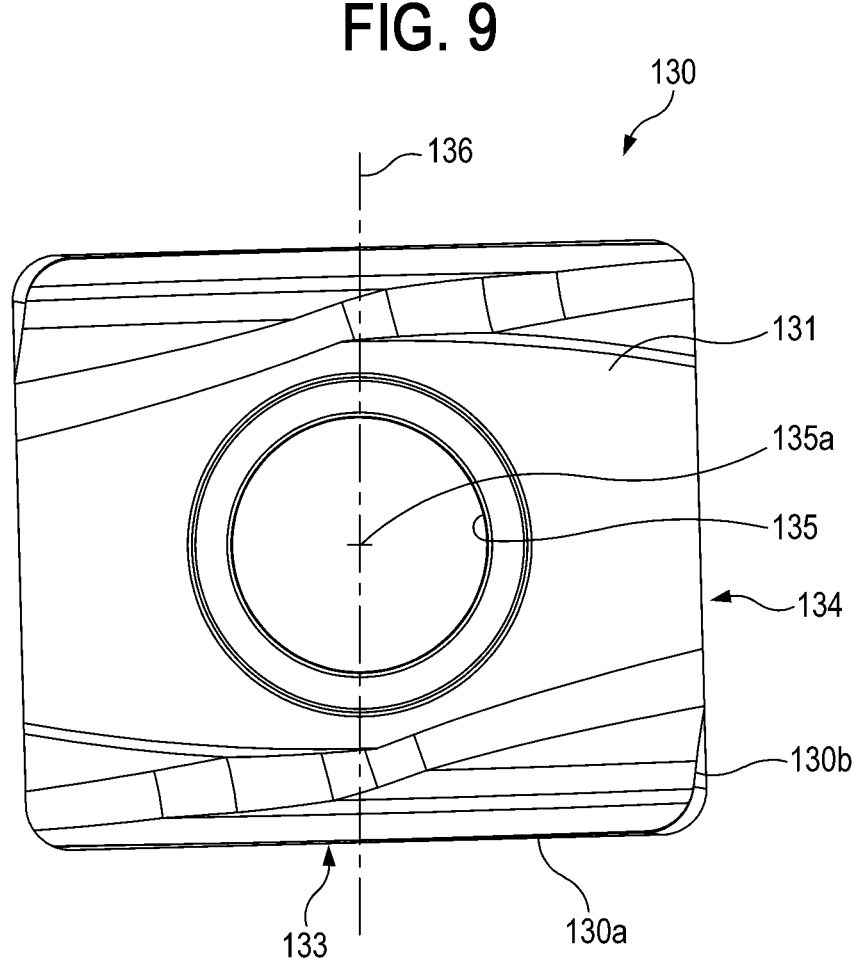
FIG. 9 is a plan view showing an upper face of the cutting insert shown in FIG. 7 according to one embodiment of the present disclosure.

FIG. 9 is a plan view showing the upper face of the cutting insert shown in FIG. 7.

In one embodiment, as shown in FIG. 9, each of the plurality of fixed cutting inserts 130 may be rotationally symmetrical with respect to a central axis 135a of the first insert bore 135, and each of the plurality of stepped cutting inserts 140 may be rotationally symmetrical with respect to a central axis of the second insert bore. Therefore, the fixed cutting insert 130 has another first major cutting edge and another first minor cutting edge formed at the positions rotated 180 degrees from the first major cutting edge 130a and the first minor cutting edge 130b about the first insert bore 135. When one first major cutting edge 130a and one first minor cutting edge 130b are damaged or broken, another first major cutting edge and another first minor cutting edge may be used to cut the workpiece.

Figure 10:
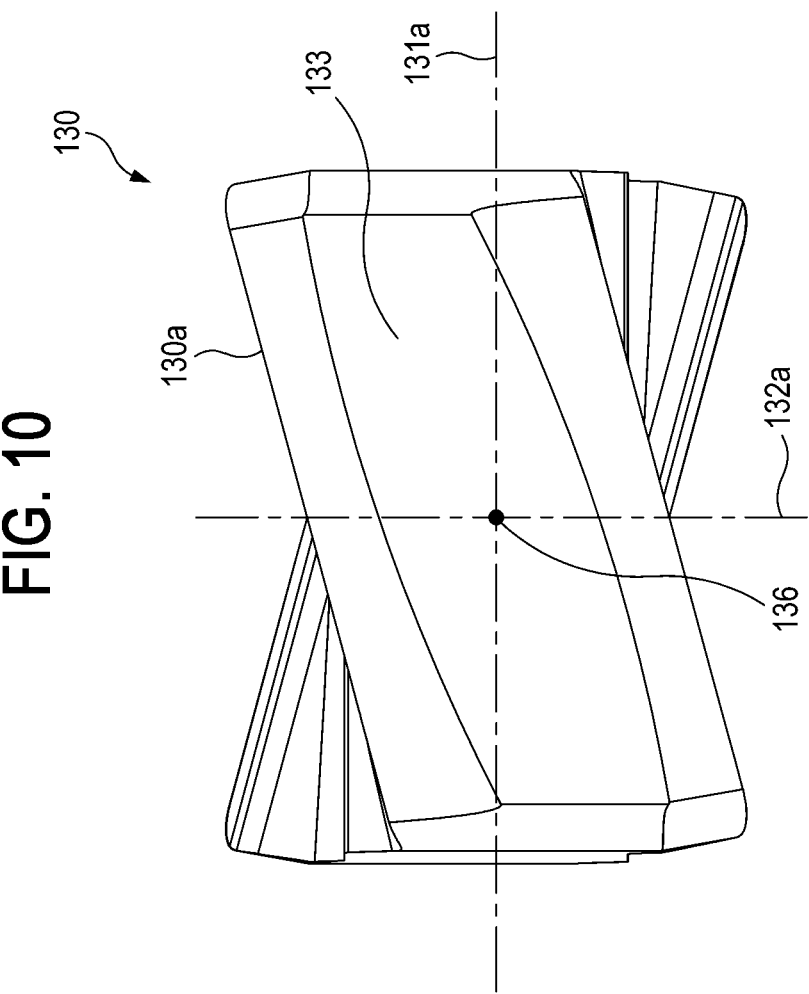
FIG. 10 is a side view showing a side face of the cutting insert shown in FIG. 7 according to one embodiment of the present disclosure.

FIG. 10 is a side view showing the side face of the cutting insert shown in FIG. 7.

In one embodiment, as shown in FIG. 10, the fixed cutting insert 130 may be rotationally symmetrical with respect to an axis 136 where a virtual intermediate surface 131a located between the upper face 131 and the lower face 132 passes through the central axis 135a of the first insert bore 135 and meets the vertical surface 132a perpendicular to the intermediate surface 131a. Accordingly, another first major cutting edge may be formed at an edge where the lower face 132 and the first side face 133 meet, and another first minor cutting edge may be formed at an edge where the lower face 132 and the second side face 134 meet. When both the first major cutting edge and the first minor cutting edge on the upper face 131 of the fixed cutting insert 130 are damaged or broken, the first major cutting edge and the first minor cutting edge on the lower face 132 may be used to cut the workpiece. For example, one fixed cutting insert may have four pairs of first major cutting edges and first minor cutting edges.

As seen above, the inventive cutting tool assembly 100 can have identical cutting inserts in all the insert pockets while the cutting edges of at least some cutting inserts are located at different radial distances from the rotational axis and at different axial distances from the bottom surface. This can be realized with an inventive cutter body in accordance with some embodiments of the present invention having insert pockets in a rotationally asymmetric arrangement The inventive cutter body 110 has a bottom surface 111 and a cylindrical body portion 112 adjoining the bottom surface 111, and having a rotational axis RA around which the cutter body 110 rotates in a direction of rotation. The cutter body 110 has a plurality of circumferentially spaced apart insert pockets 120 opening out to both the bottom surface 111 and the cylindrical body portion 112. Each insert pocket 120 has a pocket base surface 122 provided with a pocket bore 124 configured to receive the set screw 150 to secure a cutting insert to the pocket. Each insert pocket (or more precisely, the center of its pocket bore 124) is at a radial distance d1, d21, d22 from the rotational axis RA (See FIG. 2) and at an axial distance from the bottom surface 111. The plurality of insert pockets 120 are arranged into a first set of insert pockets and a second set of insert pockets. Members of the first set of insert pockets circumferentially alternate with members of the second set of insert pockets. Each pocket base surface of the first set of insert pockets is at an identical, first radial distance d1 from the rotational axis RA, and at an identical first axial distance from the bottom surface. Meanwhile, the pocket base surfaces of the second set of insert pockets are at second radial distances d21, d22, etc. from the rotational axis which are all different from one another, and at second axial distances from the bottom surface which are all different from one another.

In other words, the inventive cutter body 110 is rotationally symmetric about the rotational axis RA with respect to members of the first set of insert pockets, but is rotationally asymmetric about the rotational axis RA with respect to members of the second set of insert pockets.

In some embodiments of the inventive cutter body, the first radial distance associated with the first set of (rotationally symmetrically arranged) insert pockets is greater than all the second radial distances associated with the second set of (rotationally asymmetrically arranged) insert pockets. Meanwhile, the first axial distance associated with the (rotationally symmetrically arranged) first set of insert pockets is smaller than all the second axial distances associated with the (rotationally asymmetrically arranged) second set of insert pockets.

In some embodiments of the inventive cutter body, the first radial distance associated with the first set of (rotationally symmetrically arranged) insert pockets is greater than all the second radial distances associated with the second set of (rotationally asymmetrically arranged) insert pockets. Meanwhile, the first axial distance associated with the (rotationally symmetrically arranged) first set of insert pockets is greater than all the second axial distances associated with the (rotationally asymmetrically arranged) second set of insert pockets.

In some embodiments of the inventive cutter body, within the second set of insert pockets, the second radial distances of adjacent pocket base surfaces 122 may differ from one another by no more than 1 mm, while the second axial distances of adjacent pocket base surfaces may differ from one another by no more than 0.5 mm.

In some embodiments of the inventive cutter body, within the second set of insert pockets, the second radial distances of adjacent pocket base surfaces 122 continue to increase or continue to decrease in the direction of rotation and/or the second axial distances of adjacent pocket base surfaces continue to increase or continue to decrease, in the direction of rotation.

Although the present disclosure has been described in relation to some embodiments, it should be noted that there may be various modifications and changes without departing from the spirit and scope of the present disclosure, which can be understood by those skilled in the art. In addition, such modifications and changes should be construed to belong to the scope of the claims appended herein.

The invention claimed is:

1. A cutting tool assembly, comprising:
   a cutter body extending perpendicularly from a bottom surface and including a cylindrical portion with a rotational axis;
   a plurality of insert pockets disposed and formed concavely in the bottom surface and the cylindrical portion of the cutter body to be spaced apart from each other along a circumferential direction;
   a plurality of fixed cutting inserts mounted within the plurality of insert pockets and disposed at the outermost portion of the cutter body in a radial direction; and
   a plurality of stepped cutting inserts mounted within the plurality of insert pockets, each of the plurality of stepped cutting inserts being disposed between two adjacent fixed cutting inserts among the plurality of fixed cutting inserts;
   wherein:
   each of the plurality of fixed cutting inserts is disposed to have an identical length from the rotational axis and an identical length from the bottom surface;
   at least one stepped cutting insert among the plurality of stepped cutting inserts is disposed to have a different length from the rotational axis and a different length from the bottom surface compared to the remaining stepped cutting inserts among the plurality of stepped cutting inserts;
   the length from the rotational axis of each of the plurality of fixed cutting inserts is equal to or longer than the length from the rotational axis of each of the plurality of stepped cutting inserts; and
   the length from the bottom surface of each of the plurality of fixed cutting inserts is equal to or shorter than the length from the bottom surface of each of the plurality of stepped cutting inserts.

2. The cutting tool assembly of claim 1, wherein each of the plurality of stepped cutting inserts is disposed to have different lengths from the rotational axis and different lengths from the bottom surface with one another.

3. The cutting tool assembly of claim 1, wherein the plurality of stepped cutting inserts are disposed such that the length of each of the stepped cutting inserts from the rotational axis gradually increases or decreases along the circumferential direction.

4. The cutting tool assembly of claim 3, wherein the plurality of stepped cutting inserts are disposed such that two adjacent stepped cutting inserts among the stepped cutting inserts have the same length difference from the rotational axis.

5. The cutting tool assembly of claim 1, wherein the plurality of stepped cutting inserts are disposed such that the length of each of the stepped cutting inserts from the bottom surface gradually increases or decreases along the circumferential direction.

6. The cutting tool assembly of claim 5, wherein the plurality of stepped cutting inserts are disposed such that two adjacent stepped cutting inserts among the stepped cutting inserts have the same length difference from the bottom surface.

7. The cutting tool assembly of claim 1, wherein the plurality of stepped cutting inserts are disposed such that, for two adjacent stepped cutting inserts among the stepped cutting inserts, a length difference from the rotational axis is longer than a length difference from the bottom surface.

8. The cutting tool assembly of claim 1, wherein a total number of the plurality of fixed cutting inserts and the plurality of stepped cutting inserts is 6 to 20.

9. The cutting tool assembly of claim 1, wherein each of the plurality of fixed cutting inserts has the same shape as each of the plurality of stepped cutting inserts.

10. The cutting tool assembly of claim 1, wherein:
   each of the plurality of fixed cutting inserts includes a plurality of first major cutting edges and a plurality of first minor cutting edges; and
   each of the plurality of stepped cutting inserts includes a plurality of second major cutting edges and a plurality of second minor cutting edges.

11. The cutting tool assembly of claim 1, wherein:
   a first insert bore for mounting within each of the insert pockets is formed in each of the plurality of fixed cutting inserts; and
   a second insert bore for mounting within each of the insert pockets is formed in each of the plurality of stepped cutting inserts.

12. The cutting tool assembly of claim 11, wherein:
   each of the plurality of fixed cutting inserts is rotationally symmetrical with respect to a central axis of the first insert bore; and
   each of the plurality of stepped cutting inserts is rotationally symmetrical with respect to a central axis of the second insert bore.

13. A cutter body comprising:
   a bottom surface;
   a cylindrical body portion adjoining the bottom surface, and having a rotational axis around which the cutter body has a direction of rotation; and
   a plurality of circumferentially spaced apart insert pockets opening out to both the bottom surface and the cylindrical body portion, each insert pocket having a pocket base surface which is at a radial distance from the rotational axis and at an axial distance from the bottom surface; wherein:
   the plurality of insert pockets are arranged into a first set of insert pockets and a second set of insert pockets, members of the first set of insert pockets circumferentially alternating with members of the second set of insert pockets;
   each pocket base surface of the first set of insert pockets is at an identical, first radial distance from the rotational axis, and at an identical first axial distance from the bottom surface; and
   the pocket base surfaces of the second set of insert pockets are at second radial distances from the rotational axis which are all different from one another, and at second axial distances from the bottom surface which are all different from one another, the first radial distance is greater than all the second radial distances, the first axial distance is smaller than all the second axial distances.

14. The cutter body according to claim 13, wherein, within the second set of insert pockets:
   the second radial distances of adjacent pocket base surfaces differ from one another by no more than 1 mm, and
   the second axial distances of adjacent pocket base surfaces differ from one another by no more than 0.5 mm.

15. The cutter body according to claim 13, wherein, within the second set of insert pockets:
   the second radial distances of adjacent pocket base surfaces continue to increase or continue to decrease, in the cutter body's direction of rotation; and
   the second axial distances of adjacent pocket base surfaces continue to increase or continue to decrease, in the cutter body's direction of rotation.

16. A cutting tool assembly, comprising:
   a cutter body according to claim 13, and
   identical cutting inserts seated in all of the insert pockets.

* * * * *